(No Model.)  3 Sheets—Sheet 1.

C. E. GILES & A. H. MAXWELL.
HAY RAKE AND LOADER.

No. 511,887.  Patented Jan. 2, 1894.

WITNESSES:

INVENTORS
Carl E. Giles
Albert H. Maxwell

BY

ATTORNEY.

(No Model.) 3 Sheets—Sheet 3.

C. E. GILES & A. H. MAXWELL.
HAY RAKE AND LOADER.

No. 511,887. Patented Jan. 2, 1894.

WITNESSES:

Carl E. Giles
Albert H. Maxwell
INVENTORS

BY
ATTORNEY.

UNITED STATES PATENT OFFICE.

CARL E. GILES AND ALBERT H. MAXWELL, OF COUNCIL BLUFFS, IOWA; SAID MAXWELL ASSIGNOR TO GEORGE W. SUES, OF OMAHA, NEBRASKA.

HAY RAKE AND LOADER.

SPECIFICATION forming part of Letters Patent No. 511,887, dated January 2, 1894.

Application filed July 16, 1892. Serial No. 440,269. (No model.)

*To all whom it may concern:*

Be it known that we, CARL E. GILES and ALBERT H. MAXWELL, of Council Bluffs, in the county of Pottawattamie and State of Iowa, have invented certain useful Improvements in Hay Rakes and Loaders, and we do hereby declare that the following is a full, clear, and exact description of the invention, such as will enable others skilled in the art to which it appertains to make and use the same, reference being had to the accompanying drawings, which form a part of this specification.

This invention has relation to a new and novel hay rake and loader, the object being to provide a loader that shall be readily operated, and be vertically adjustable, as will be described more fully hereinafter and finally pointed out in the claims.

Figures 1, 2:
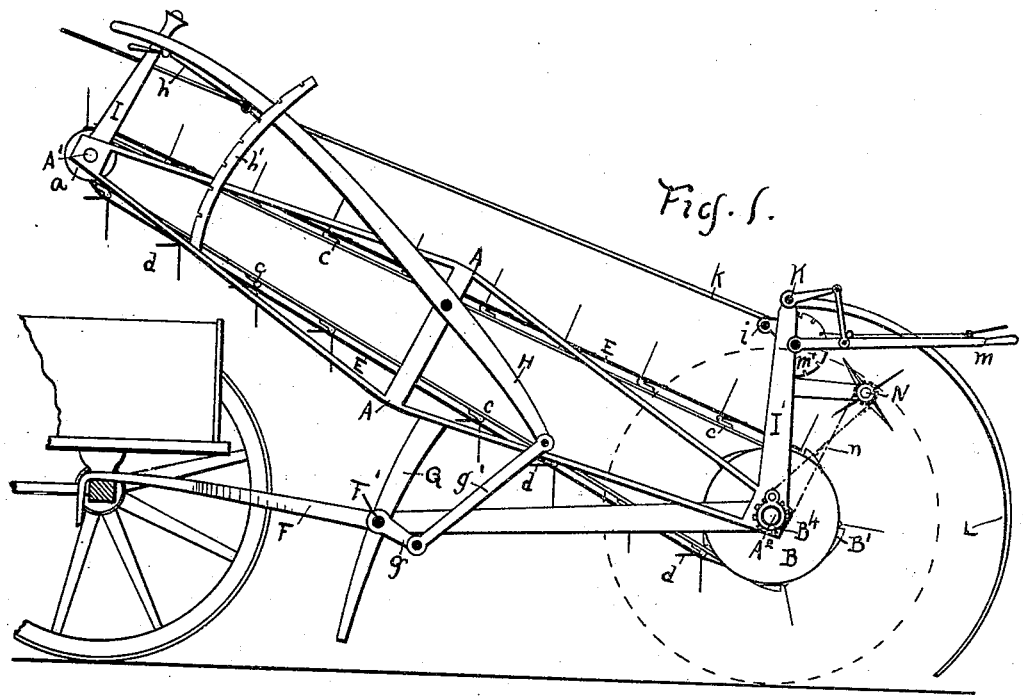
Figure 3:
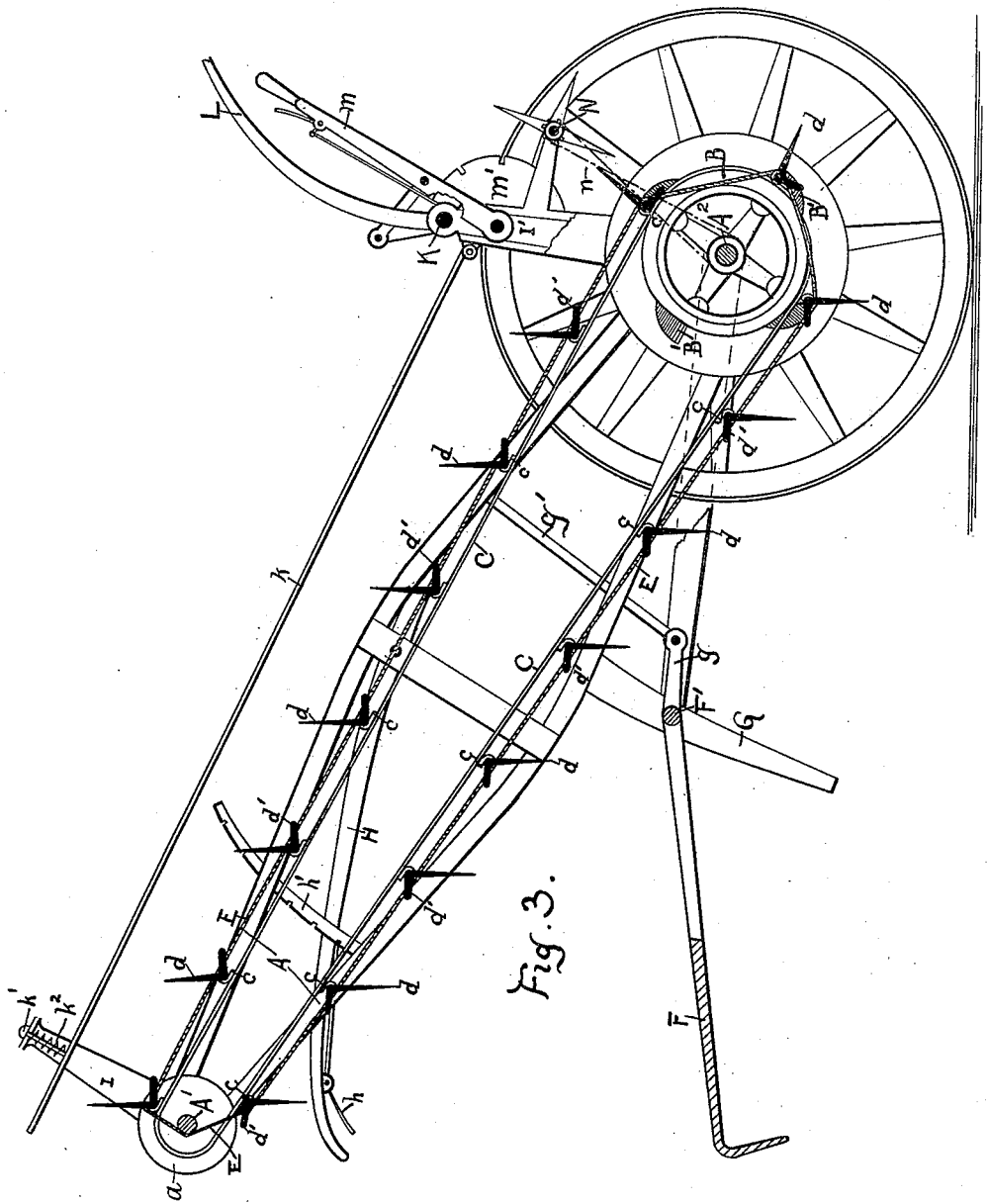
Figure 4:
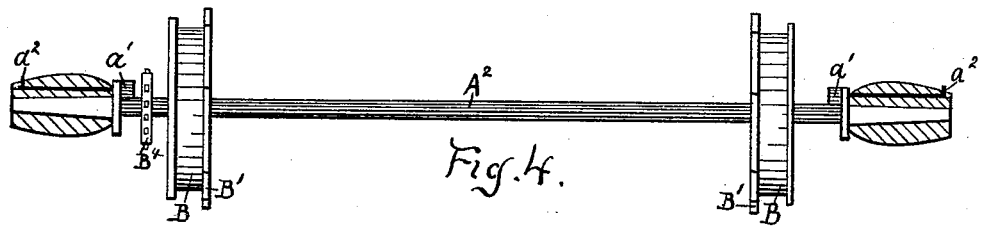
Figure 5:
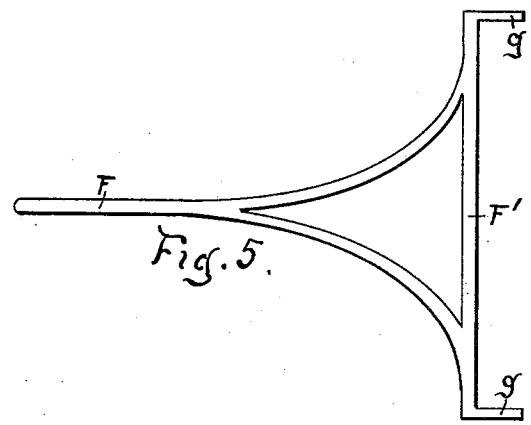
Figure 6:
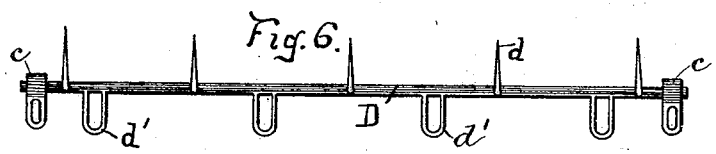
Figure 7:
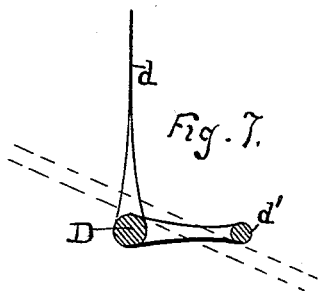
Figure 8:
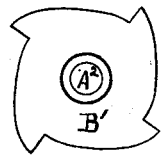

In the accompanying drawings Figure 1 shows a side elevation of our rake and loader. Fig. 2 is a top view; Fig. 3 a central sectional view. Fig. 4 shows the main supporting and driving axle; Fig. 5 a top view of the supporting lever; Fig. 6 a top view of one of the tooth bars; Fig. 7 a sectional view of the tooth bar, and Fig. 8 a side elevation of one of the driving sprockets.

Similar letters refer to corresponding parts.

A A represent two diamond-shaped supporting frames of steel or iron, suitably braced, the ends of which are connected by means of the shafts, A' and A². The upper shaft, A', is simply provided with two pulleys, $a$, $a$, while the lower, A², forms the supporting and operating shaft as shown. This shaft is preferably a cylindrical bar, provided at each end with the usual axle skeins, wheels, and the lugs, $a'$, $a'$, which are provided with a cylindrical opening. The wheels, which are mounted upon the axle as usual, are provided within the hub with a latch bar, $a^2$, one end of which projects outward, and is operated by hand. The other end of this bar, $a^2$, is adapted to work within the lug, $a'$, and so connect the wheel and axle when the loader is operated, as shown in Fig. 4.

Working upon the axle, A², and within the frame, are the two similar flanged pulleys, B B, and the operating sprockets, B' B', both pulleys and sprockets being fixed upon the axle. Working upon the flanged pulleys, $a$, $a$, B, B, are the belts, C, C, preferably of rubber, which are provided with the tooth bars, D, D, connected to the belts by means of the eyes, $c$ $c$. These bars are preferably cast in malleable iron, and provided with a set of upwardly extending teeth, $d$, and the extending loops, $d'$. These bars work freely within the eyes, $c$ and are adapted to operate in conjunction with the belts, C, C, as a huge sprocket chain. At the lower end the driving sprockets, B', B', are adapted to successively engage the tooth bars, D, D, as shown in Fig. 3. The bars being loosely mounted within the bearings, $c$, $c$, would not operate to gather and carry the collected hay, if they were not held in a perpendicular position in their upward movement. To properly hold the teeth in this upward or forward movement, we provide the hemp or wire cords, or strands, E, E, which pass through the loops, $d$, so that when loaded the teeth would be held as shown in Fig. 3. As the teeth, however, passed over the pulleys, $a$, $a$, the teeth would upset by virtue of the load, so that the teeth would hang downward, and thus lose their load. The belts, C, C, and connected tooth bars, D, D, are driven solely by means of the sprockets, B', B', the belts being guided at the upper end by means of the pulleys, $a$, $a$.

The loader is secured to any suitable vehicle by means of the hooked supporting lever, F, the transverse bar, F', of which is held within the brace bars G, forming part of the frame A, and secured to the rear of the vehicle, as shown in Fig. 1.

Secured to the stub arms, $g$, $g$, of the bar, F', are the connecting rods, $g'$, $g'$, attached at their upper ends to the operating levers, H, H, pivotally and adjustably secured to the frame, A, by means of the spring actuated lever rods, $h$, working within notches of the bar, $h'$. By means of the levers, H, the upper end of the loader may be adjusted vertically, so as to carry the unloading end toward or from the vehicle. The frame, A, is further provided with the upwardly extending and connected arms, I, I, and I', I', the latter being provided at the upper end with the transverse shaft, $i$, supporting the wooden slats, $k$, extending lengthwise above the tooth bars and supported in front by means of the rods, $k'$, working within the transverse portion of the arms, I, I. The rods, $k'$, are provided with the springs, $k^2$, so as always to keep the hay loading upon the teeth.

Secured to the transverse shaft, K, is an ordinary rake, L, but operated and adjustably secured to the frame, A, and adapted to be locked in any suitable position by means of the lever $m$ and quadrant $m'$. When not in use this rake is folded back upon the loader, as will be understood in referring to Fig. 3. The arms, I', I', are further provided with the transverse kicker shaft, N, positioned to the rear and above the axle, $A^2$. This shaft, N, is provided with a sprocket gear and chain, $n$, and connected to the axle, by means of the sprocket $B^4$ upon the axle. The kicker is adapted to swiftly revolve, and throw the hay forward, and thus prevent the hay from clogging below the rake, L.

It will be noticed that the tooth bars and connected belts are operated by means of the sprockets, B', B', which directly engage said bars in operating the loader. The device may further be raised or lowered at the unloading end, by means of the levers, H, H; and at the rear we provide a kicker and an adjustable rake.

Having thus described our said invention, what we claim as new, and desire to secure by United States Letters Patent, is—

1. In a hay rake and loader, the combination with a supporting frame, of a supporting and a guiding axle, pulleys upon said axles adapted to hold two endless belts, a series of pivoted tooth bars connecting said belts, said bars being provided with projecting supporting loops, and cables passing through said loops to hold said tooth bars in vertical position in loading; all substantially as, and for the purpose, set forth.

2. In a hay rake and loader, the combination with the elongated diamond shaped supporting frame A connected by means of the shafts A', $A^2$, said shaft $A^2$ having the lugs $a'$ and being provided with supporting wheels having the bars $a^2$ adapted to work within openings of said lugs, the axle or shaft $A^2$ being further provided with the operating sprockets B', B', and the flanged pulleys B, B, the shaft A' having the pulleys $a$, $a$, the belts C C working over said pulleys $a$ $a$ and B B and connected by means of the pivoted tooth bars D, said bars being provided with projecting loops, and cables passing through said loops, said bars being operated by means of the sprockets B', B' working directly against them, and said shaft $A^2$ being operated or released by means of the bars $a^2$, and lugs $a'$, all substantially as and for the purpose set forth.

3. In a hay rake and loader, the combination with an elongated diamond shaped frame A connected by means of the shafts A', $A^2$, the shaft $A^2$ being provided with suitable supporting wheels, the upwardly extending arms I, I, I', I', the latter being provided with the shaft $i$, supporting the slats $k$, the spring actuated rods $k'$ movably holding the slats $k$, at one end, the lever F, bar F' held within the bars G, forming part of the main frame and provided with the stub arms $g$, the connecting arms $g'$, attached at their upper ends to the levers H, said levers being provided with the spring actuated adjusting lever $h$, working within the bar $h'$, all substantially as and for the purpose set forth.

4. In a hay rake and loader, the combination with a supporting frame, of a supporting and a guiding axle $A^2$, pulleys B upon said axles adapted to hold two endless belts C, C, a series of pivoted tooth bars D connecting said belts, said bars being provided with projecting supporting loops $d'$, and cables E passing through said loops to hold said tooth bars in vertical position in loading, the arms I', I', supporting the kicker shaft N, positioned in rear and above the axle $A^2$ and in chain and sprocket connection with said axle $A^2$, all substantially as and for the purpose set forth.

In testimony whereof we affix our signatures in presence of witnesses.

CARL E. GILES.
ALBERT H. MAXWELL.

Witnesses for Carl E. Giles:
  H. A. LYMAN,
  J. J. FOGT.
Witnesses for Albert H. Maxwell:
  H. A. LYMAN,
  G. W. SUES.